United States Patent [19]

Tufts

[11] 4,215,573
[45] Aug. 5, 1980

[54] FLUID METERING DEVICE

[76] Inventor: Wesley M. Tufts, 154 Holly La., Holliston, Mass. 01746

[21] Appl. No.: 964,713

[22] Filed: Nov. 29, 1978

[51] Int. Cl.³ .............................................. G01F 3/08
[52] U.S. Cl. ...................................................... 73/255
[58] Field of Search ...................... 73/194 E, 255, 229

[56] References Cited

U.S. PATENT DOCUMENTS

| | | | |
|---|---|---|---|
| 818,566 | 4/1906 | Scotti | 73/255 X |
| 2,439,239 | 4/1948 | Crever | 417/43 |
| 2,776,568 | 1/1957 | Ward et al. | 73/255 |
| 3,403,555 | 10/1968 | Versaci | 250/565 |
| 3,408,940 | 11/1968 | McGrogan | 417/43 |
| 4,032,259 | 6/1977 | Brown | 417/43 |
| 4,118,980 | 10/1978 | Debaux | 73/194 |

FOREIGN PATENT DOCUMENTS 1209547 10/1970 United Kingdom ...................... 73/255

*Primary Examiner*—Herbert Goldstein
*Attorney, Agent, or Firm*—Robert T. Gammons

[57] ABSTRACT

A fluid metering device comprising an annular conductor defining a passage of predetermined uniform cross section and supports supporting the conductor horizontally, said conductor containing an inlet port at the top side through which the fluid to be metered is supplied to the conductor and an outlet port at the bottom side through which the fluid to be metered is discharged, a ball situated in the passage which is free to be moved along the passage by the fluid pressure of the fluid delivered to the conductor, said ball being of a diameter corresponding to the inside diameter of the passage, sensing devices mounted to the support adjacent the conductor for sensing the passage of the ball within the conductor and an integrator for increasing or decreasing the supply of fluid to the conductor in inverse proportion to the travel of the ball along said passage.

11 Claims, 5 Drawing Figures

FLUID METERING DEVICE

BACKGROUND OF THE INVENTION

Devices for precisely measuring fluid for various purposes are old in the art. Usually such devices are provided with stepper motors which are, of course, insensible to changes in ambient conditions such as temperature and pressure which, in turn, affect the viscosity of the fluid being metered. It is the purpose of this invention to provide a device for metering precisely measured quantities of fluid which will be independent of ambient conditions, which is of such simple construction as to enable discarding the metering component after one use which makes it especially attractive for medical purposes or for chemical processes where minute traces of a chemical would seriously affect the final use and, finally, to provide a device which can be readily adapted for the handling of fluids of different kinds, of different chemical compositions and viscosities, in large or small quantities and at high or low pressures.

SUMMARY

As herein illustrated, the fluid metering device of this invention comprises an annular conductor defining a passage of predetermined uniform cross section, means supporting the annular conductor in a horizontal plane, said conductor containing an inlet port at the top side through which the fluid to be metered is supplied to the conductor and an outlet port at the bottom side through which the fluid to be metered is discharged, a ball situated within the passage which is free to be moved along the passage by the fluid pressure of the fluid delivered to the conductor, said ball being of a diameter corresponding to the inside diameter of the passage, sensing means mounted to the support adjacent the conductor for sensing the passage of the ball within the conductor and means for increasing or decreasing the supply of fluid to the conductor in inverse proportion to the travel of the ball along said passage. The conductor tube is translucent and the sensing means is photo-optical. Four such sensing devices are used spaced at equal radial and circumferential distances about the annular conductor. The ball is comprised of any suitable material and preferably is buoyant with respect to the fluid being metered. There are means on the base and the annular tube detachably interengageable to position the annular tube on the base properly oriented with respect to the sensors and to enable its removal and discard after use. The fluid is introduced to the inlet port through a branch positioned at an angle of approximately 25° to the plane of the annular tube in the direction of flow and forwardly of the outlet port and the fluid is discharged through the outlet port through a branch which is situated at an angle of approximately 135° to the plane of the annular tube in the direction of flow.

The invention will now be described in greater detail with reference to the accompanying drawings, wherein.

Figure 5:
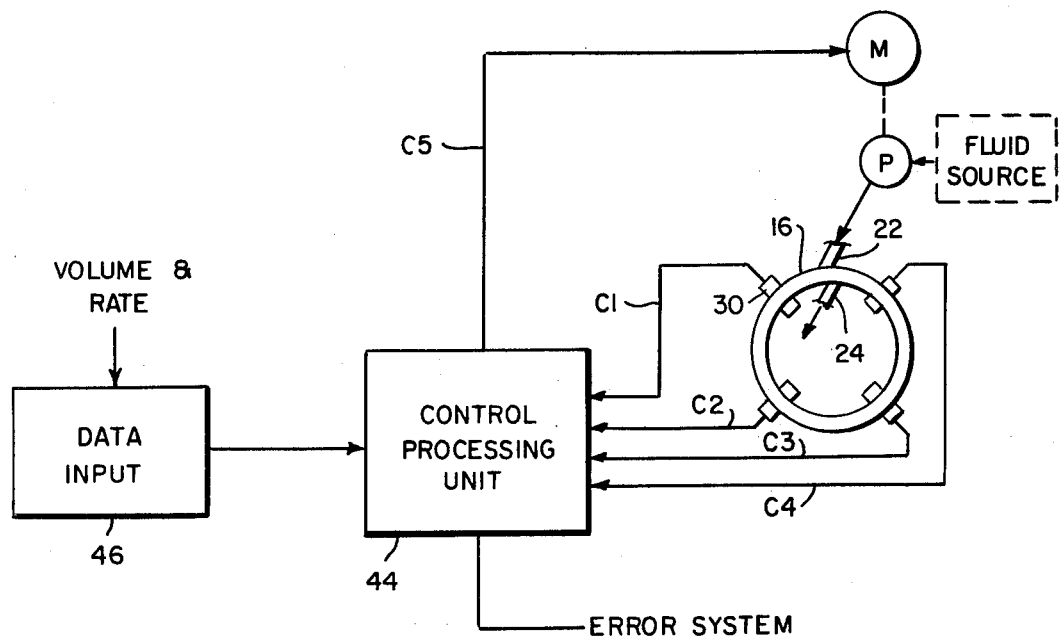

FIG. 5 diagrammatically illustrates the control including the pump for supplying the fluid to the conductor, the central processing unit for programming the operation and the data input unit.

Figure 1:
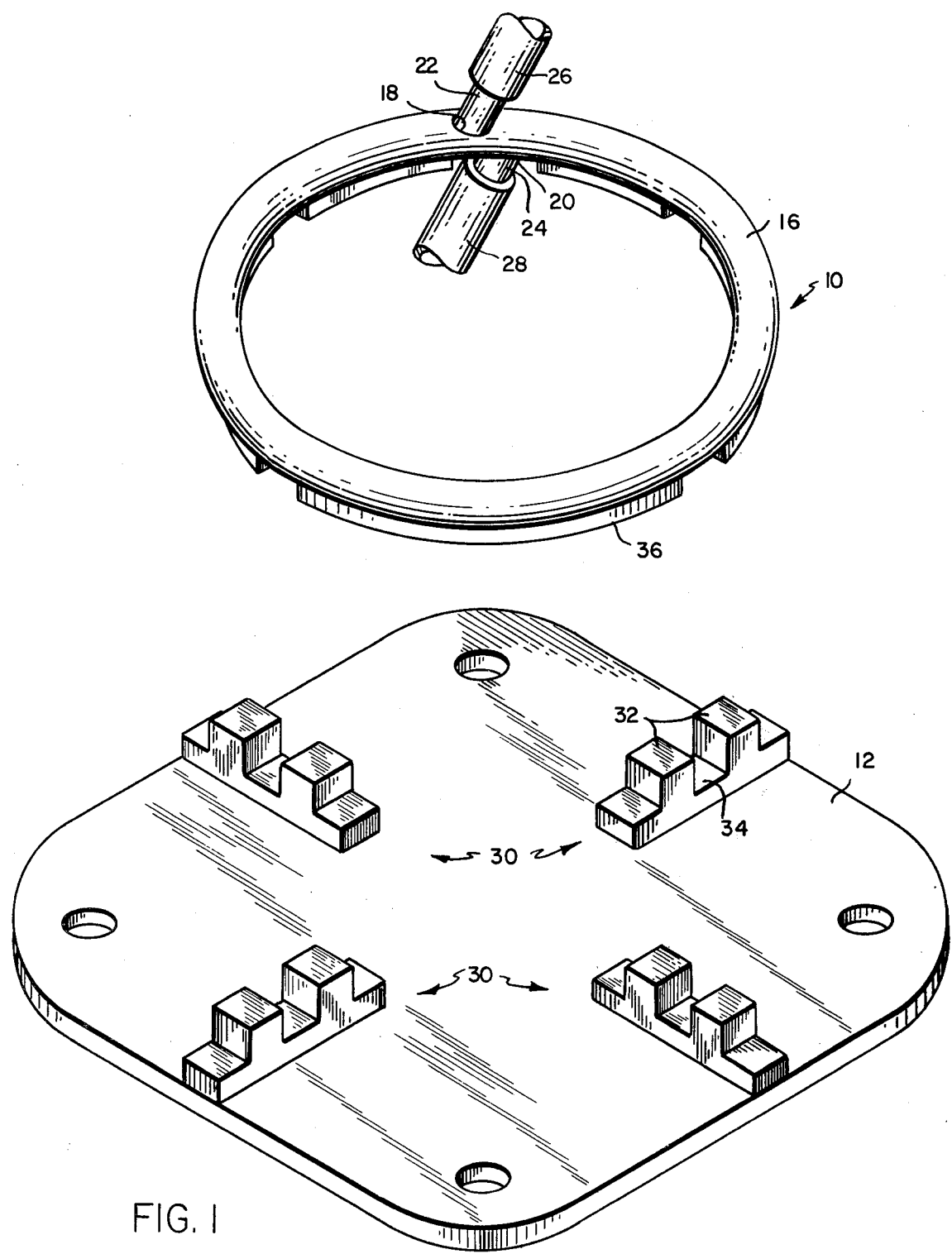
FIG. 1 is an exploded perspective view of the device showing the annular conductor spaced above its support.
Figure 2:
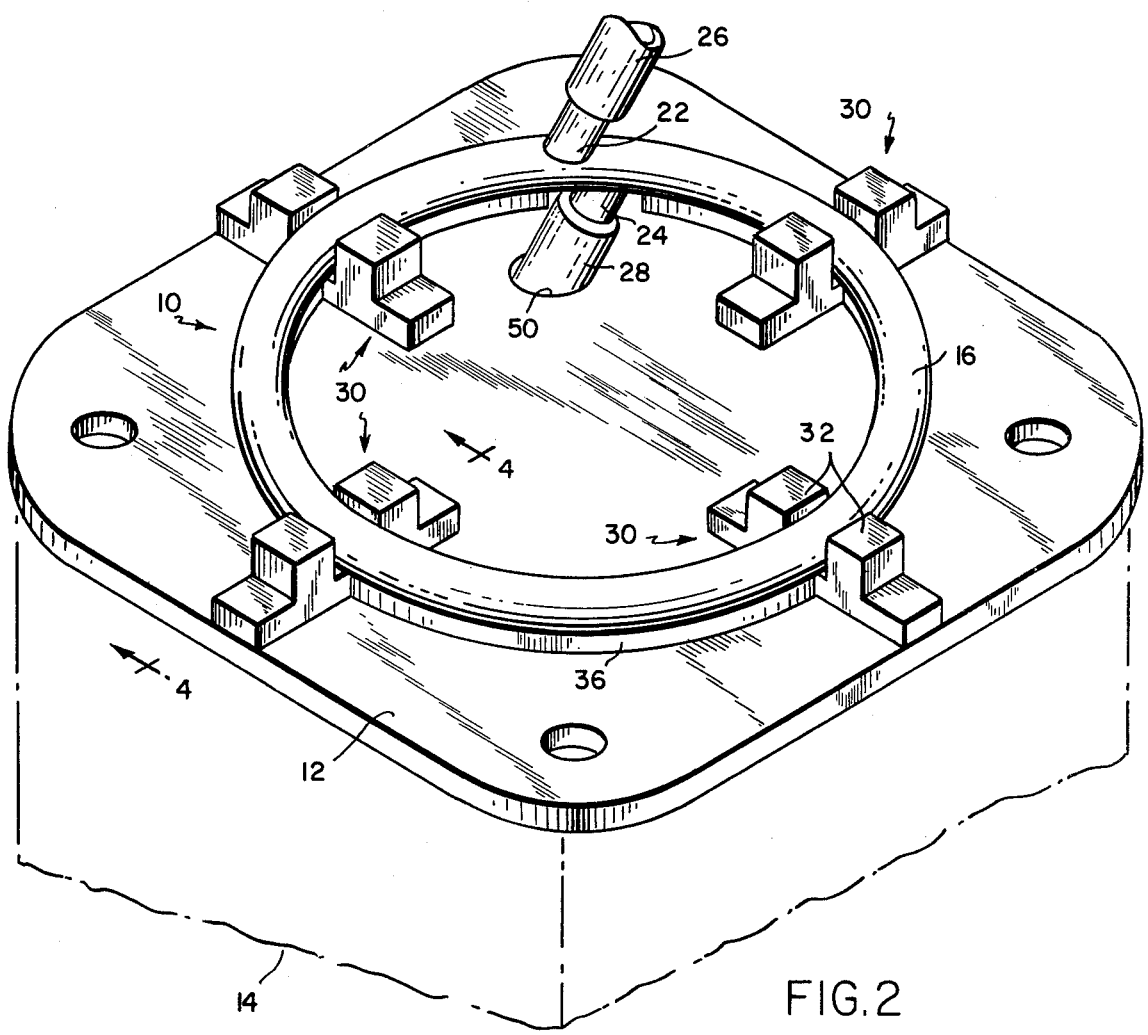
FIG. 2 is a perspective view of the annular conductor mounted to its support.

Referring to the drawings, FIGS. 1 and 2, the fluid metering device of this invention comprises essentially an annular metering component 10 for receiving the fluid to be metered, a support 12 for supporting the component 10 in a horizontal position, said support 12 comprising a rigid substantially rectangular panel board affixed to the top of a cabinet structure 14 within which is housed a motor-driven pump MP for pumping the fluid to the metering component and integrating means for translating the pulses received into signals such as to control the speed of operation of the motor-driven pump.

Figure 3:
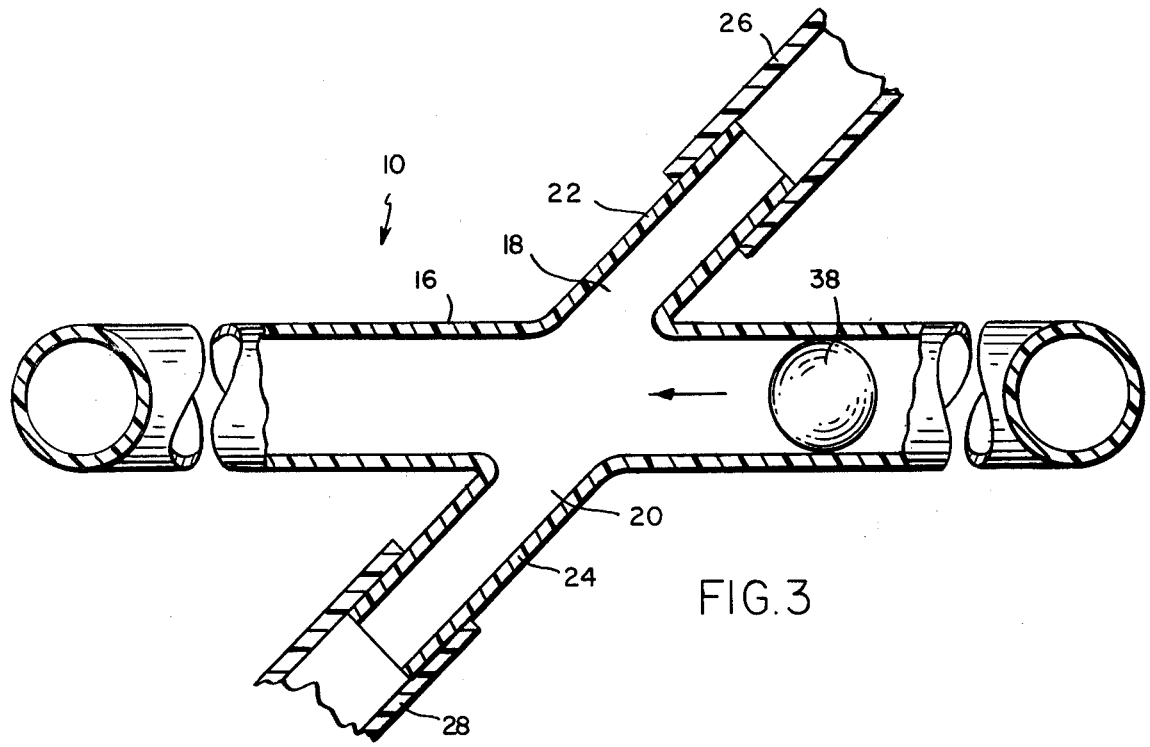
FIG. 3 is an elevation of the annular conductor partly in section showing the direction of flow of the fluid.

The metering component 10 as shown in FIGS. 1, 2 and 3 comprises an annular tube 16 of uniform circular cross section having at its upper side a port 18 and at its lower side a port 20 which, respectively, provides for introducing the fluid to the tube 16 and discharging it therefrom. The ports 18 and 20 are located in offset relation to each other as illustrated in FIG. 3 with the inlet port 18 set forwardly of the outlet port 20 with respect to the direction of flow of fluid through the tube 16. Preferably, the inlet port 18 is provided with a spur 22 which is inclined at an angle of approximately 25° to the horizontal plane of the tube and the outlet port is provided with a spur 24 which is located at an angle of approximately 135° to the plane of the tube. The spurs 22 and 24 are adapted to receive the ends of conductors 26 and 28, the conductor 26 being connected at its opposite end to a motor-driven pump P shown in FIG. 5 and the spur 24 being adapted to be connected by the conductor 28 to the place of delivery of the metered fluid for its particular use.

The support 12 for the tube 16 has on it quarterly spaced mounting blocks 30, each of which has a pair of upstanding bosses 32—32 which define a slot 34 for receiving the tube 16 and the latter is provided at its underside with arcuate supporting ribs 36 which extend downwardly therefrom and have flat bottom surfaces 37 for engagement with the planar surface to support the tube 16 between the blocks 30 uniformly horizontal. The structure described enables removably mounting the metering tube to the support 12 so that when a metering operation has been completed, the metering tube may be removed and thrown away or be replaced by a metering tube of different internal dimension for a fluid of different chemical composition and/or viscosity.

A ball 38 is enclosed within the tube 16 of a diameter corresponding substantially to the inside diameter of the tube, but with sufficient clearance to be free to roll lengthwise of the tube and to be pushed along the tube by the fluid pumped into it through the port 18. Preferably, the ball 38 should be buoyant so as to be carried along by the flowing fluid without drag and should be comprised of a material which is inert with respect to the fluid being metered. The ball may be plastic, glass, ceramic, or metal and may be of solid or hollow section.

Figure 4:
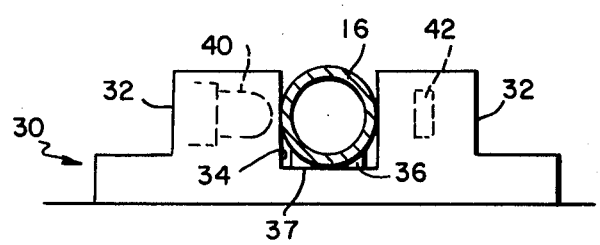
FIG. 4 is a section taken on the line 4—4 of FIG. 2.

The tube 16 is preferably comprised of a translucent material, for example, a translucent plastic, although it may be glass, so that the ball is optically visible as it travels around the circumference of the tube 16 and there is mounted at each of the supporting blocks 30 an optical sensor comprising as shown in FIG. 4, a light source 40 and a light-sensitive cell or receptor 42, the components 40 and 42 being housed within the bosses 32—32 in alignment and at a level such that a beam of light from the source 40 will travel diametrically through the tube 16 to the cell 42. As thus arranged, each time the ball passes between a light source 40 and cell 42, it interrupts the light beam and produces a signal. The signals thus provuded in each of the optical sensing devices are fed by means of conductors C1, C2, C3 and C4 to an integrator 44, as shown in FIG. 5. The integrator, in turn, sends a signal through a conductor C5 to a step motor M which drives a pump P and, as previously mentioned, the pump P supplies the fluid which is to be metered through the conductor 26, spur 22 and port 18 to the metering tube 16. The integrator operates by reception of the signals from the several optical devices to either speed up or slow down the motor M so that if the ball as it travels from one optical sensor to the other is traveling at a lower rate than would deliver the predetermined metered amount of fluid, the motor will be speeded up and if it is traveling too fast so that it would deliver a greater quantity of fluid than the predetermined amount, the motor M will be slowed down. By sensing the travel of the ball at quarterly distances, the signals will be supplied to the integrator frequently enough so that a very close control of the speed of the motor may be obtained with a corresponding very close and precise control of the flow of fluid. The integrator 42 commonly referred to as a central processing unit so designated sends signals in the form of pulses to the step motor M which is preferably a digital step motor.

The volume and rate of flow of fluid through the tube 16 is set into the processing unit 44 by a data input unit 46 which may be adjusted to cause the central processing unit to respond to a predetermined pulse rate.

While the metering tube 16 is preferably translucent, it is within the scope of the invention to employ an opaque tube and to substitute for the optical sensors proximity sensors. Further, it is within the scope of the invention to change the number of sensors, that is, to use a lesser number than four or a greater number than four.

The central processing unit 44, data input unit 46 and digital step motor M and pump P are housed within the cabinet 14 beneath the support plate 12 and this apparatus, together with the support plate 12, form a relatively permanent structure. The conductor 28 from the discharge port, as shown, passes downwardly through the support plate 12 through an opening 50.

Desirably, the tube 16 is made of a sufficiently inexpensive material so that it can be disconnected from the conductors 26 and 28 after it has been used for a particular metering operation and replaced with an unused tube, the reason for this being that in the medical and chemical fields, it is especially important not to contaminate one fluid with another and so it is essential to be able to substitute a new tube for each metering operation.

It should be understood that the present disclosure is for the purpose of illustration only and includes all modifications or improvements which fall within the scope of the appended claims.

I claim:

1. A fluid metering device comprising an annular conductor defining a passage of predetermined uniform cross section, a rigid panel having a planar top surface, means on said surface for releasably attaching the conductor thereto comprising four blocks spaced at equal radial and circumferential distances about a common center, said blocks having pairs of radially-spaced, upstanding bosses between which the conductor is adapted to be received, said conductor containing an inlet port through which the fluid to be metered is supplied to the conductor and an outlet port through which the fluid to be metered is discharged, a ball situated in the passage which is free to move along the passage by the fluid pressure of the fluid delivered to the conductor, said ball being of a diameter corresponding to the inside diameter of the passage, sensing means mounted to the support adjacent the conductor for sensing the passage of the ball within the conductor, a fluid pump and means operably connecting the sensing means to the fluid pump to increase or decrease the supply of fluid to the conductor in inverse proportion to the travel of the ball along said passage.

2. A fluid metering device according to claim 1 wherein the conductor is translucent and the sensing device is photo-optical.

3. A fluid metering device according to claim 1 wherein the ball is buoyant.

4. A fluid metering device according to claim 1 wherein there are four sensing devices located quarterly about the conductor to sense the passage of the ball at the four quarters of its travel.

5. A fluid metering device according to claim 1 wherein the first means are locating means on the conductor and the supporting means for positioning the conductor correctly with respect to the sensing means.

6. A fluid metering device according to claim 1 wherein the sensing means are mounted on the blocks in position to sense the passage of the ball along the passage.

7. A fluid metering device according to claim 1 wherein the sensing means comprise a light source and a receiving material on the block at the outer and inner surface of the tube.

8. A fluid metering device according to claim 1 wherein the inlet port is supplied with fluid through a branch connected to the conductor at said port at an angle of approximately 45° to the direction of flow.

9. A fluid metering device according to claim 1 wherein the outlet port discharges the fluid through a branch connected to the conductor at said port at an angle of approximately 135° to the direction of flow.

10. A fluid metering device according to claim 1 wherein the inlet port is spaced forwardly from the outlet port with respect to the direction of flow.

11. A fluid metering device according to claim 1 wherein the fluid pump is motor-driven, the sensing means produces signals and there is integrator means operable by assimilation of the signals to increase and decrease the speed of the motor of the motor-driven pump.

* * * * *